(12) United States Patent
Mazanek et al.

(10) Patent No.: US 7,637,527 B2
(45) Date of Patent: Dec. 29, 2009

(54) MOUNTING ELEMENT, MOUNTING TOOL, AND MOUNTING-SET

(75) Inventors: Jan Mazanek, Billdal (SE); Ridvan Oral, Altomünster (DE)

(73) Assignee: Autoliv Development AB, Vargarda (SE)

( * ) Notice: Subject to any disclaimer, the term of this patent is extended or adjusted under 35 U.S.C. 154(b) by 293 days.

(21) Appl. No.: 11/439,927

(22) Filed: May 24, 2006

(65) Prior Publication Data

US 2007/0216139 A1 Sep. 20, 2007

(30) Foreign Application Priority Data

Mar. 15, 2006 (DE) .................... 10 2006 011 836

(51) Int. Cl.
*F16B 19/00* (2006.01)
(52) U.S. Cl. .................. 280/728.2; 280/730.2; 411/508
(58) Field of Classification Search ............. 280/728.2, 280/749, 730.2; 411/508, 509, 510, 913
See application file for complete search history.

(56) References Cited

U.S. PATENT DOCUMENTS

| | | | | |
|---|---|---|---|---|
| 3,905,570 | A * | 9/1975 | Nieuwveld | 248/71 |
| 4,527,821 | A * | 7/1985 | Tanaka | 292/19 |
| 4,672,719 | A * | 6/1987 | Scott | 24/113 R |
| 5,539,962 | A | 7/1996 | Lee | |
| 5,636,891 | A | 6/1997 | Van Order et al. | |
| 6,565,116 | B1 | 5/2003 | Tajima et al. | |
| 6,843,630 | B2 * | 1/2005 | Sbongk | 411/508 |
| 6,955,514 | B2 * | 10/2005 | Hoshi | 411/508 |
| 7,188,392 | B2 * | 3/2007 | Giugliano et al. | 24/295 |
| 7,229,052 | B2 * | 6/2007 | Takeuchi | 248/71 |
| 7,374,200 | B2 * | 5/2008 | Ikeda et al. | 280/728.2 |
| 2007/0158931 | A1 * | 7/2007 | Baumgartner et al. | 280/728.2 |

FOREIGN PATENT DOCUMENTS

| | | |
|---|---|---|
| DE | 2522729 | 12/1975 |
| DE | 202004014219 U1 | 12/2004 |
| EP | 0889247 | 1/1999 |

\* cited by examiner

*Primary Examiner*—Paul N Dickson
*Assistant Examiner*—Nicole Verley
(74) *Attorney, Agent, or Firm*—Brinks Hofer Gilson & Lione

(57) ABSTRACT

A mounting element having an essentially rectangular base plate with four edges from which two first arms extend and face each other. The first arms have a first contact section a first distance from the base plate. At least two second arms also face each other, which exhibit a second contact section a second distance from the base plate which is greater than the first distance. At least the first arms extend to their first contact section from the base plate in such a way that their distance from each other increases. In order to achieve an improved retaining effect, one arm extends from each edge of the base plate so that the base plate and arms surround an inner space.

11 Claims, 4 Drawing Sheets

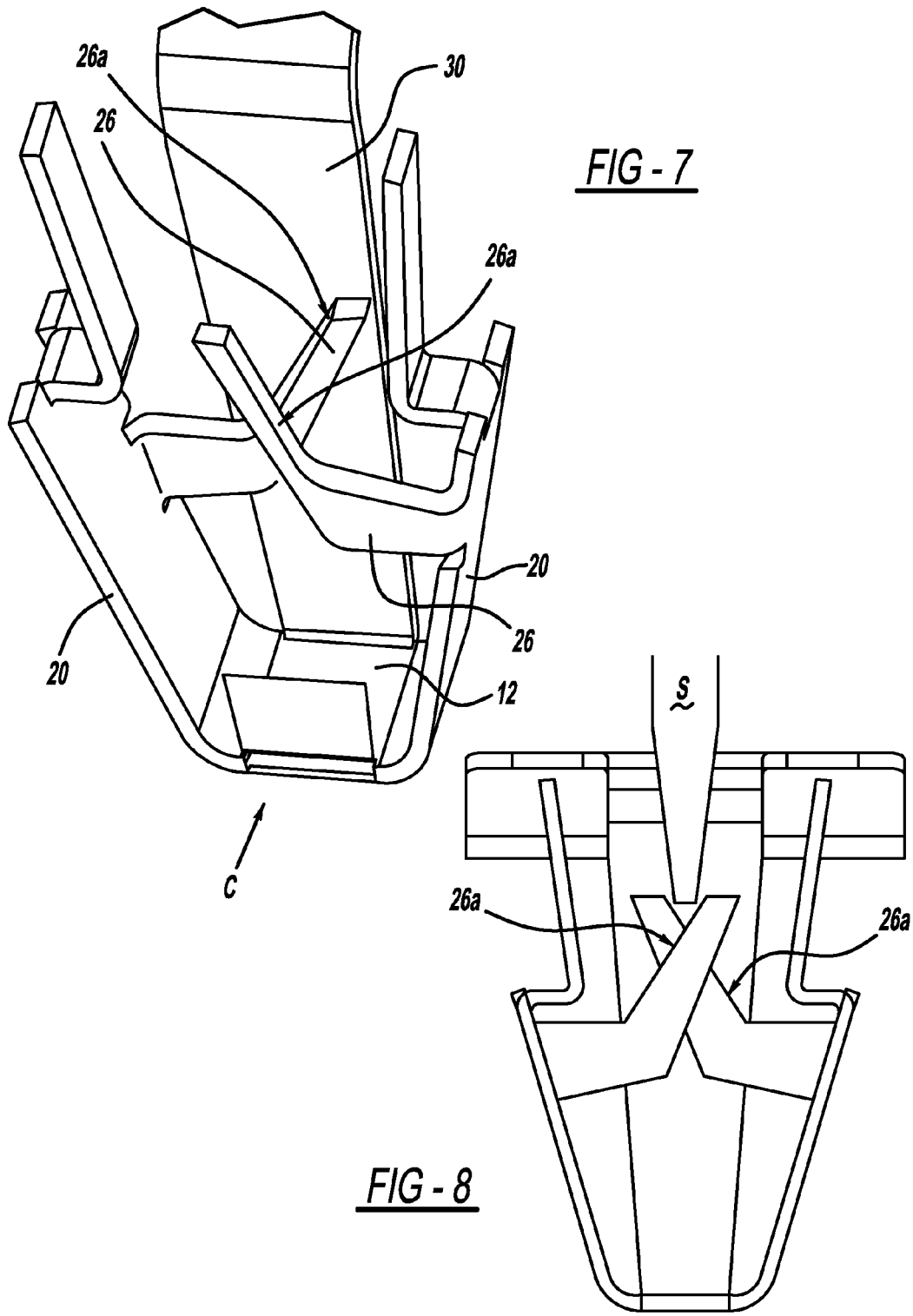

MOUNTING ELEMENT, MOUNTING TOOL, AND MOUNTING-SET

CROSS REFERENCE TO RELATED APPLICATIONS

This application claims priority to German patent application DE 102006011836.7, filed on Mar. 15, 2006.

BACKGROUND

1. Field of the Invention

The present invention relates to a mounting element for use in a motor vehicle. More specifically, it relates to a clip mounting element for connecting an airbag to an internal structure of the motor vehicle.

2. Description of Related Art

Clip mounting elements play a large part in vehicle engineering and are used, for example, to connect airbag fabric with the internal structure of a motor vehicle. Such clip connections are used, in particular, in the case of airbags with large surfaces such as side curtain airbags. Here, both the edge of the airbag and the internal structure of the vehicle include through-holes. A corresponding mounting element extends through these two through-holes when the airbag is mounted in the vehicle to clamp the airbag fabric to the internal structure of the vehicle.

A mounting element for a clip connection is described, for example, in U.S. Pat. No. 6,565,116. The mounting element is formed in one piece and includes two pairs of arms which extend from an essentially rectangular base plate which is long in shape. Each of these arms includes a contact section, whereby in the mounted state the contact sections of the first arms are located on one side of the metal sheet associated with the vehicle, and the contact sections of the second arms are located on the other side of the metal sheet associated with the vehicle, thus creating the desired connection. The second arms are formed so as to be elastic. The two pairs of arms extend from two edges of the base plate which face each other, i.e. two arms extend from each side.

The task of the present invention is to provide an improved mounting element such that an improved retaining effect can be achieved.

SUMMARY

According to the present invention, one arm extends from each edge of the base plate, so that the base plate and the arms enclose an inner space. Contact sections of the arms also form a rectangle shape, which in turn means that a high degree of security is provided against tilting in both directions.

The arrangement of the arms described in the present invention, however, has further advantages. In particular, it is possible to provide actuation sections on the first arms, with whose help it is possible to achieve easy disassembly of a mounting element located on the internal structure of the vehicle. Because of the way that the arms are distributed in the present invention, the actuation sections can easily be accessed with pliers or nippers.

In a preferred embodiment of the present invention, it is possible to prevent rattling of the mounting element when it is mounted.

A preferred use of the mounting element in accordance with the present invention is the fixing of an airbag cover to the internal structure of a motor vehicle.

A further task of the present invention is to create a suitable mounting tool for such a mounting element.

This task is fulfilled by means of a mounting tool that includes a pusher, whose actuation surface essentially forms the shape of the base plate of the mounting element. This pusher contracts at the height of the first contact section, which ensures that the mounting tool can only be removed again from the inner space of the mounting element when the mounting element is fully installed.

Further objects, features and advantages of this invention will become readily apparent to persons skilled in the art after a review of the following description, with reference to the drawings and claims that are appended to and form a part of this specification.

DESCRIPTION OF THE DRAWINGS

Preferred embodiments of the present invention are described below in more detail with reference to the drawings. The drawings are as follows:

FIG. 7 is an alternative embodiment of the mounting element of the present invention; and FIG. 8 is a view of the mounting element of FIG. 7 from Direction C.

DETAILED DESCRIPTION

Figure 1:
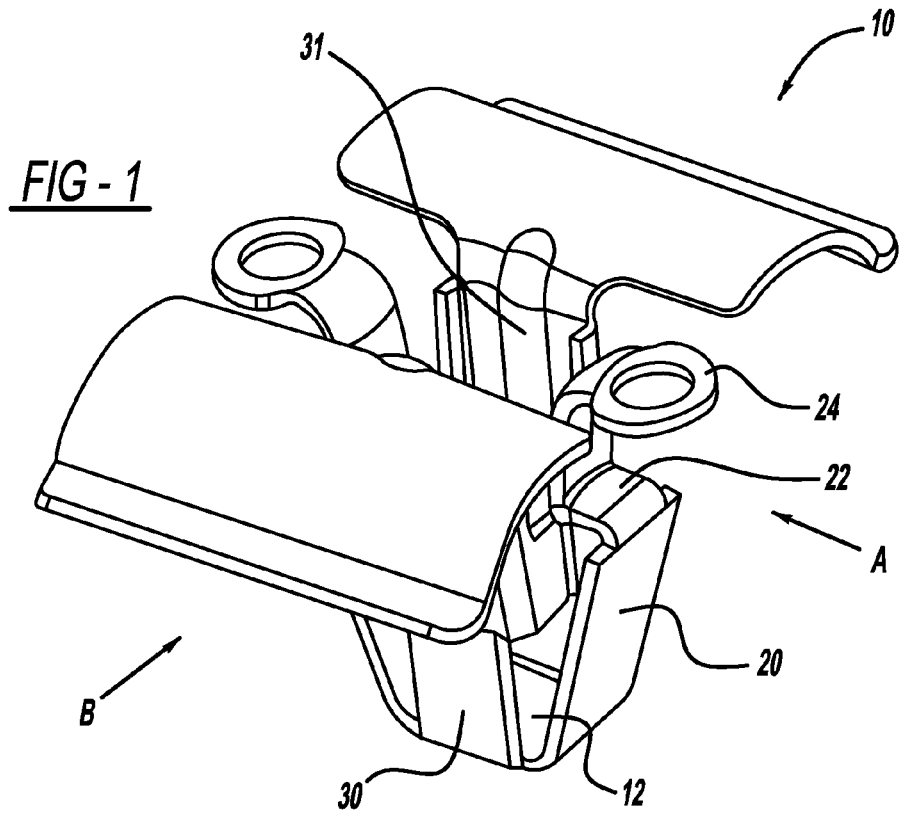
FIG. 1 is a three-dimensional view of a mounting element of the present invention.
Figure 2:
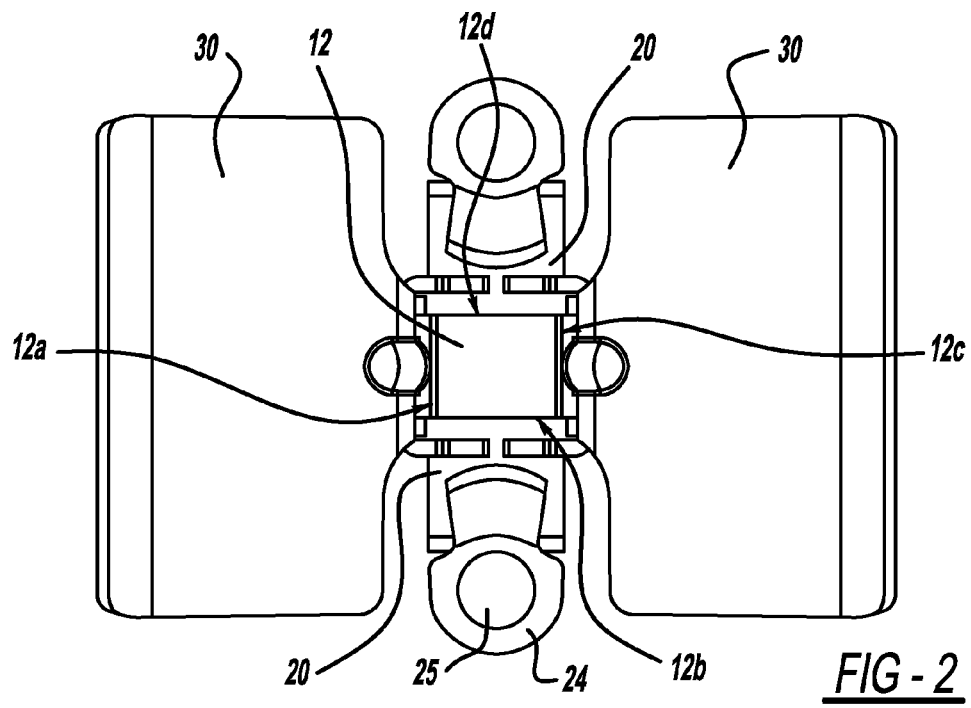
FIG. 2 is a top view of the mounting element of FIG. 1.

FIGS. 1 to 4 show a first embodiment of the mounting element from different directions. Mounting element 10 is preferably formed from a single piece of bent sheet-metal. Mounting element 10 includes a base plate 12, from which first arms 20 and second arms 30 extend. The arms are each part of a pair configured to face each other in this case, so that the four arms and base plate 12 surround an inner space. Arms 20 and 30 are formed so as to be flat, whereby they essentially have the width of sides 12a, 12b, 12c and 12d (see FIG. 2) of the base plate. Base plate 12 is rectangular, preferably square.

First arms 20 extend from the base plate 12 in such a way that their distance from one another increases up to a respective first contact section 22. At first contact sections 22, first arms 20 extend inwards essentially parallel to base plate 12. At the end of the first contact sections 22, further sections 23 (see FIG. 4) of first arms 20 also extend away from base plate 12, whereby the distance between the first two arms 20 increases. The top section of first arms 20 is formed by actuating sections 24 running parallel to base plate 12, which each include an eye 25. The first arms 20 therefore include a step at the first contact section 22 and the cross-section of the first arms 20 which are connected through base plate 12 is mushroom or omega-shaped, as can be seen particularly well in FIG. 4. If one reaches into eyes 25 with a correspondingly shaped pair of pliers and presses the actuating sections 24 towards one another, the two first contact sections 22 also move towards each other and the maximum distance between the two first arms 20 decreases. A mounting element which is installed can be removed by these means, as will later be seen clearly in FIGS. 5 and 6.

Figure 3:
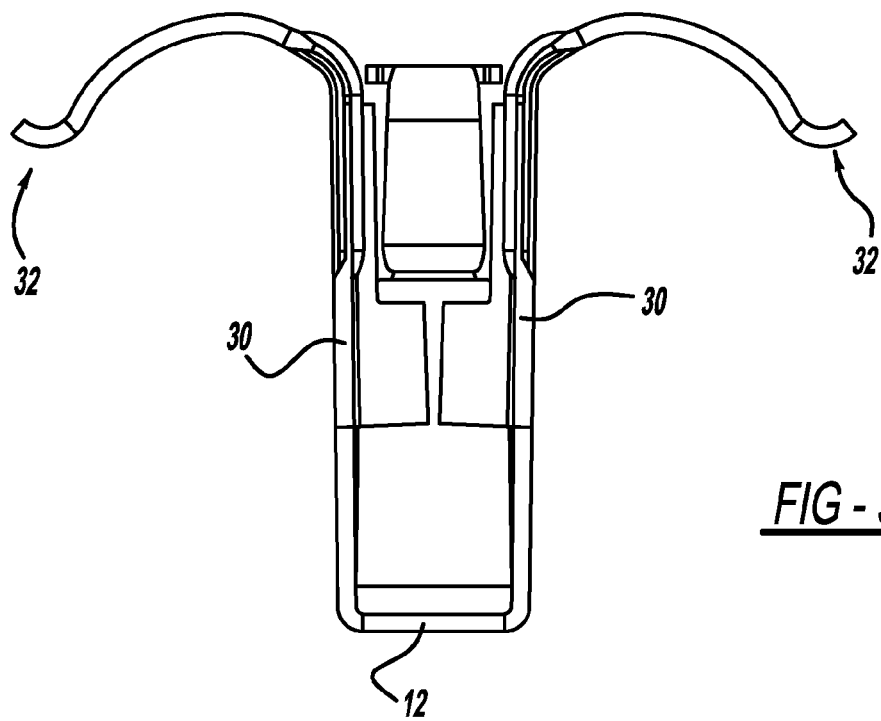
FIG. 3 is a view of the mounting element of FIG. 1 from direction A.
Figure 4:
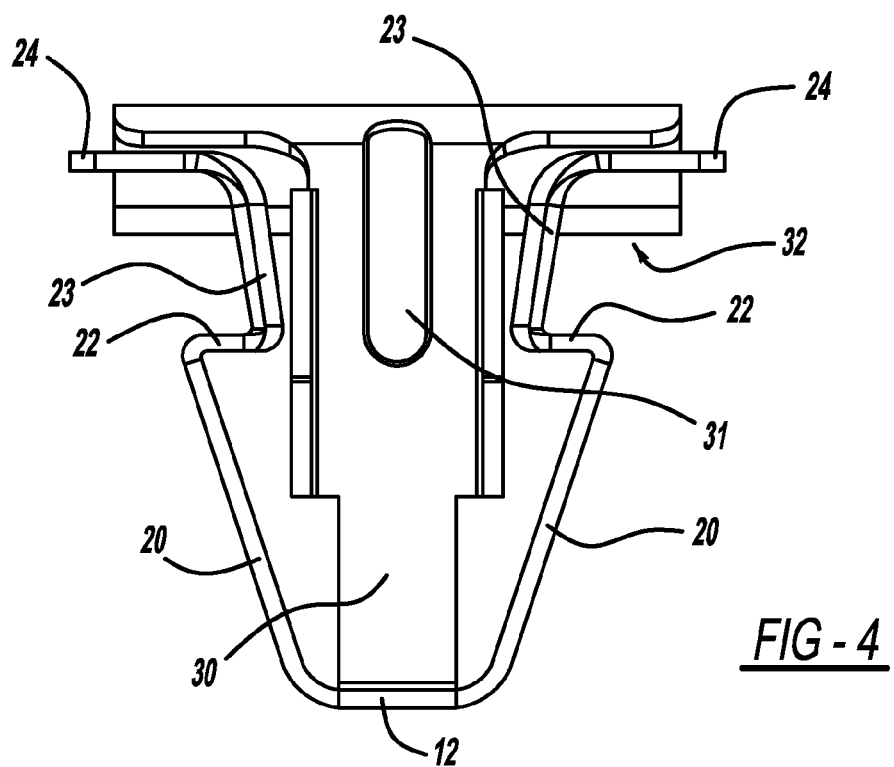
FIG. 4 is a view of the mounting element of FIG. 1 from direction B.

Furthermore, two second arms 30 extend away from base plate 12. The width of the second arms 30 correspond to the side lengths 12a and 12c of the base plate 12 (see FIG. 2). As can be seen in FIG. 3, the upper section of second arms 30 is domed so as to be U-shaped, so that second arms 30 extend to an uppermost point and from there downwards again in the direction of base plate 12 to the second contact sections 32. The second contact sections 32 have a convex shape. First contact sections 22 define a first plane and the second contact sections 32 define a second plane, whereby the two planes thus defined are parallel to one another. In a mounted condition the element onto which the mounting element 10 is attached is located between the first and the second contact surfaces 22 and 32. It can be seen that the four contact sections are arranged in such a way that the mounting element is secured against tipping in each direction. In this embodiment, the second arms 30 include stiffening grooves 31, but these are optional depending on the application.

Figure 5:
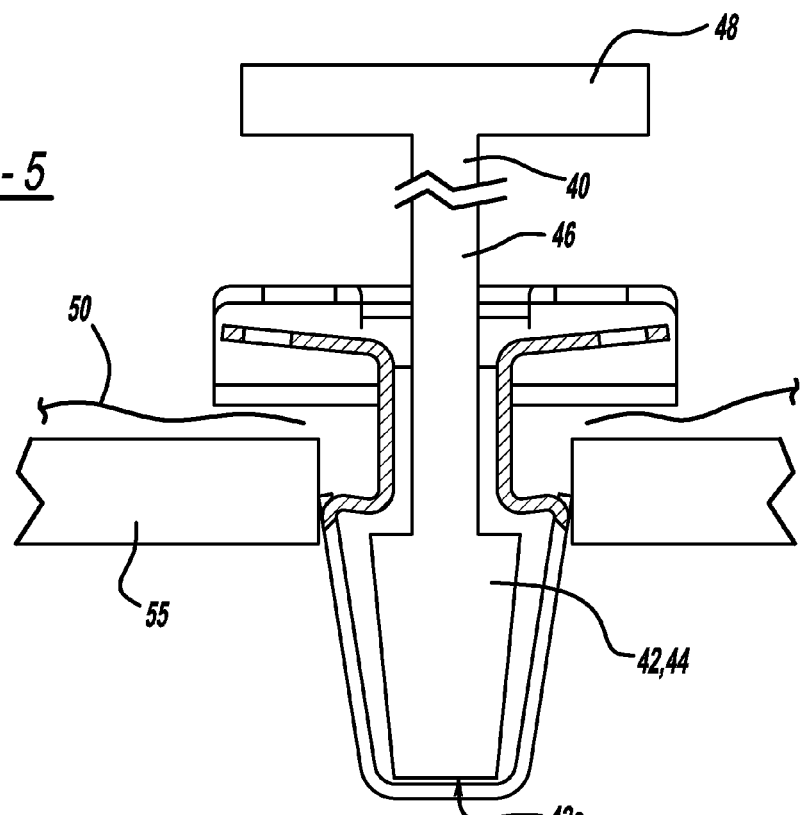
FIG. 5 is a section through the mounting element of FIG. 1 being installed with the help of a mounting tool.

FIG. 5 shows the mounting element 10 described above while being installed with a mounting tool 40. Here, an airbag fabric 50 is mounted directly or indirectly on a metal part 55, whereby both the airbag fabric 50 and the metal part 55 exhibit a through-hole. Mounting element 10 is then installed with the help of the mounting tool 40.

The mounting tool 40 includes a pusher 42, whose actuation surface 42a essentially has the form of the base plate 12. The actuation surface 42a can also be smaller than the base plate 12, but it is important that the pusher 42 reaches to the base plate 12. A lower section 44 of pusher 42 extends from here, and widens in a conical fashion. Somewhat beneath the steps which form first contact section 22, pusher 42 becomes narrower towards the upper section 46 and extends from there to a handle 48. The purpose of this shape can be easily be seen with reference to FIGS. 5 and 6.

Figure 6:
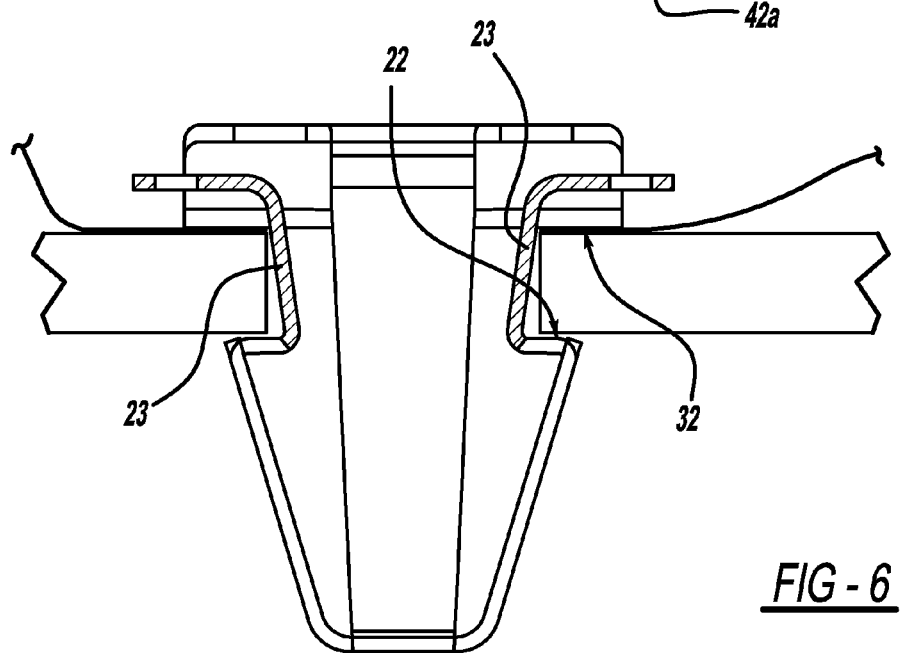
FIG. 6 is the mounting element of FIG. 1 following engagement of the mounting element in a through-hole.

If first arms 20 are in an essentially force-free outer position, pusher 42 can be introduced into the inside of mounting element 10 and can be pulled out of it. However, during assembly, first arms 20 are pressed together (see FIG. 5). In this position pusher 42 cannot be pulled out of the mounting element. This ensures that it can be determined if the mounting element 10 is completely and correctly mounted (see FIG. 6), or if the mounting element 10 has not yet reached its final position (see FIG. 5). FIG. 6 shows the final mounted state. Preferably the distance between first contact sections 22 and second contact sections 32, in a state where no force is being exerted (see for example FIG. 4), is kept somewhat smaller than the overall thickness of metal parts 55 and airbag fabric 50. This means that the U-shaped top section 34 of second arm 30 is elastically distorted which prevents wobbling of the mounting element 10, preventing rattling.

Preferably the mounting element is adapted to the size of the through-hole of the metal parts in such a way that in mounted condition the further sections 23 which contact section 22 lie clamped against the metal part, further improving the stability of the connection.

The position of the second arms 30 in force-free state can be selected in such a way that the inwards swivel movement of the first arms 20 shown in FIG. 5 is not possible being blocked by the second arms 30. In this case, the second arms 30 must be pressed somewhat outwards during mounting and disassembly. This can be achieved, for example, by forming the mounting tool described above in a corresponding manner. The advantage of such a design is even greater security against loss. In addition, the necessity of using a special mounting tool which, as described above prevents incorrect assembly.

FIGS. 7 and 8 show an additional embodiment of the mounting element 10. Here, a hook-shaped leg 26 extends from each first arm 20 into the inner space of the mounting element. These legs 26 overlap in the birds-eye view shown in FIG. 2, so that actuating surfaces 26a of the leg form a "V" in the upper area. With the help of these legs 26, the ability to mount and disassemble with low force can be achieved. If a screwdriver "S" is pushed against actuating surfaces 26a during mounting, as is shown in FIG. 8, first arms 20 are moved inwards, which means that mounting element 10 can be pushed more easily into a through-hole provided for the actuating element.

The step of the first arms as is also the case in the first embodiment, formed in that inner area of the arms that are bent to the inside. In contrast to the first embodiment, the outer areas of the first arms which end in the area of the step extend up to the height of the first contact sections, so that these include a correspondingly large surface area and width.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A mounting element configured to fit into a through-hole in a surface in order to secure an airbag to a motor vehicle by contacting both sides of the surface, the mounting element comprising: an essentially rectangular base plate with four sides, wherein two first arms extend from a first pair of opposing sides of the base plate facing each other, both first arms have a first contact section having a first surface substantially parallel to the base plate and located a first distance from the base plate, two second arms extend from a second pair of opposing sides of the base plate facing each other, both second arms have a second contact section having a second surface substantially parallel to the base plate and located a second distance from the base plate, the second distance being larger than the first distance, whereby at least the first arms extend from the base plate to their first contact section such that their distance from one another increases, wherein the first arms extend beyond the first contact sections to actuation sections comprising a surface having an eye.

2. The mounting element according to claim 1, wherein the first contact sections are planar.

3. The mounting element according to claim 1, wherein the first and second contact sections are parallel to one another.

4. The mounting element according to claim 1, wherein the first arms extend from the base plate to the first contact sections, form an inward step and extend further after the step to the actuation sections.

5. The mounting element according to claim 1, wherein the mounting element is formed from a single piece of metal.

6. The mounting element according to claim 1, wherein an upper section of the second arms are U-shaped.

7. The mounting element according to claim 1, wherein the second arms have a stiffening groove extending in a longitudinal direction.

8. The mounting element according to claim 1, wherein the actuation sections are located a third distance from the base plate, wherein the third distance is greater than the second distance of the second contact sections of the second arms from the base plate.

9. A mounting element configured to fit into a through-hole in a surface in order to secure an airbag to a motor vehicle by contacting both sides of the surface, the mounting element comprising: an essentially rectangular base plate with four sides, wherein two first arms extend from a first pair of opposing sides of the base plate facing each other, both first arms have a first contact section having a first surface substantially parallel to the base plate and located a first distance from the base plate, the first arms extending beyond the first contact sections to actuation sections having a second surface substantially parallel to the base plate and extending substantially perpendicularly from the first arms, the actuation sections located a second distance from the base plate, wherein two second arms extend from a second pair of opposing sides of the base plate facing each other, both second arms have a second contact section having a third surface substantially parallel to the base plate and located a third distance from the base plate, the third distance being larger than the first distance, whereby at least the first arms extend from the base plate to their first contact section such that their distance from one another increases, wherein the second contact sections have a convex shape.

10. The mounting element according to claim 9, wherein the second distance is greater than the third distance.

11. The mounting element according to claim 7, wherein the second surface of the actuation sections have an eye.

\* \* \* \* \*

UNITED STATES PATENT AND TRADEMARK OFFICE
CERTIFICATE OF CORRECTION

PATENT NO. : 7,637,527 B2
APPLICATION NO. : 11/439927
DATED : December 29, 2009
INVENTOR(S) : Jan Mazanek and Ridvan Oral Page 1 of 1

It is certified that error appears in the above-identified patent and that said Letters Patent is hereby corrected as shown below:

In the Claims

In claim 11, column 6, line 10, after claim delete "7" and insert --10--.

Signed and Sealed this

Eighth Day of June, 2010

David J. Kappos
*Director of the United States Patent and Trademark Office*